US006577681B1

(12) United States Patent
Kimura

(10) Patent No.: US 6,577,681 B1
(45) Date of Patent: Jun. 10, 2003

(54) IMAGE CODING APPARATUS

(75) Inventor: Shunichi Kimura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/384,545

(22) Filed: Aug. 27, 1999

(30) Foreign Application Priority Data

Sep. 16, 1998 (JP) ............................................ 10-261939

(51) Int. Cl.⁷ .......................... H04N 7/12; H04N 11/02; H04N 11/04
(52) U.S. Cl. ................................ 375/240.2; 375/240.03
(58) Field of Search .......................... 375/240.2, 240.03

(56) References Cited

U.S. PATENT DOCUMENTS

| | | | | | |
|---|---|---|---|---|---|
| 5,774,634 A | * | 6/1998 | Honma et al. | ............... | 395/109 |
| 5,809,041 A | * | 9/1998 | Shikakura et al. | ............ | 371/31 |
| 5,970,172 A | * | 10/1999 | Mochizuki | ................... | 382/233 |
| 6,005,622 A | * | 12/1999 | Haskell et al. | ............... | 348/400 |
| 6,173,079 B1 | * | 1/2001 | Hwang | ........................ | 382/239 |
| 6,304,990 B1 | * | 10/2001 | Shikakura | ................... | 714/747 |
| 6,341,144 B1 | * | 1/2002 | Haskell | .................... | 375/340.2 |
| 6,347,116 B1 | * | 2/2002 | Haskell et al. | ......... | 375/240.03 |

FOREIGN PATENT DOCUMENTS

| | | |
|---|---|---|
| JP | 5-103208 | 4/1993 |
| JP | 5-145773 | 6/1993 |
| JP | 6-98307 | 4/1994 |
| JP | 7-107296 | 4/1995 |
| JP | 7-212757 | 8/1995 |
| JP | 7-288809 | 10/1995 |
| JP | 8-265769 | 10/1996 |

OTHER PUBLICATIONS

H. Yasuda, "International Standards of Multimedia Coding," 1991, Maruzen Co., Ltd., pp. 18–23.
Annex C, "Variable Quantization" ITU–T T.84 ISO/IEC 10918–3, 1996, pp. 32–33.
H. Yasuda, "International Standards Multimedia Coding," 1991, Maruzen Co., Ltd., pp. 126–156.

* cited by examiner

*Primary Examiner*—Chris Kelley
*Assistant Examiner*—Charles Parsons
(74) *Attorney, Agent, or Firm*—Morgan, Lewis & Bockius LLP

(57) ABSTRACT

In coding through adaptive quantization after transforming an image into frequency areas, such as JPEG, quantization step width control information and other information are efficiently coded. An input image is processed in a blocking circuit and a quantizer. A quantization step width is determined by multiplying a matrix of a basic quantization table by an SF value of a scaling factor calculating circuit. Quantized AC components are coded in an AC component coding circuit 51. Quantized DC components are converted into DC differences and further into group numbers and additional bits. SF values are also converted into SF value differences and further into group numbers and additional bits. The DC components and the group numbers of the SF values are converted into two-dimensional Huffman codes. The above described code elements are multiplexed and outputted.

15 Claims, 15 Drawing Sheets

FIRST EMBODIMENT

SECOND EMBODIMENT

FIG. 3

SF DIFFERENCE GROUPING TABLE

| GROUP NO. | SF DIFFERENCE | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7~-4, 4~7 | 3 |
| 4 | -15~-8, 8~15 | 4 |
| 5 | -31~-16, 16~31 | 5 |

FIG. 4

TWO-DIMENSIONAL HUFFMAN CODING TABLE

| | | GROUP NUMBER (DC DIFFERENCE) | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 |
| GROUP NUMBER (SF DIFFERENCE) | 0 | | | | | | | | | | | | |
| | 1 | | | | | | | | | | | | |
| | 2 | | | | | | | | | | | | |
| | 3 | | | | | | | | | | | | |
| | 4 | | | | | | | | | | | | |
| | 5 | | | | | | | | | | | | |

FIG. 5

OCCURRENCE FREQUENCY DISTRIBUTION

| | SF DIFFERENCE GROUP | | | | | | TOTAL |
|---|---|---|---|---|---|---|---|
| | 0 | 1 | 2 | 3 | 4 | 5 | |
| 0 | 200 | 1 | 1 | 1 | 1 | 1 | 205 |
| 1 | 100 | 100 | 80 | 60 | 5 | 1 | 346 |
| 2 | 50 | 80 | 40 | 40 | 5 | 1 | 216 |
| 3 | 20 | 50 | 30 | 30 | 5 | 1 | 136 |
| 4 | 1 | 40 | 20 | 10 | 50 | 1 | 122 |
| 5 | 1 | 5 | 5 | 10 | 40 | 30 | 91 |
| 6 | 1 | 1 | 1 | 2 | 30 | 20 | 55 |
| 7 | 1 | 1 | 1 | 1 | 20 | 20 | 44 |
| 8 | 1 | 1 | 1 | 1 | 10 | 20 | 34 |
| 9 | 1 | 1 | 1 | 1 | 1 | 10 | 15 |
| 10 | 1 | 1 | 1 | 1 | 1 | 1 | 6 |
| 11 | 1 | 1 | 1 | 1 | 1 | 1 | 6 |
| TOTAL | 378 | 282 | 182 | 158 | 169 | 107 | 1276 |

DC DIFFERENCE GROUP

FIG. 6

FOURTH EMBODIMENT

FIG. 10

AN ILLUSTRATION OF OUTPUT PATTERN

| SF DIFFERENCE | QUANTIZATION TABLE SELECTION INFORMATION | OUTPUT PATTERN | CODE |
|---|---|---|---|
| 0 | 0 | 00 | 0 |
| 0 | NOT 0 | 01 | 10 |
| NOT 0 | 0 | 10 | 110 |
| NOT 0 | NOT 0 | 11 | 111 |

FIG. 11

ILLUSTRATION OF GROUPING

| GROUP NO. | DC DIFFERENCE | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7~-4, 4~7 | 3 |
| 4 | -23~-8 | 4 |
| 5 | 8~23 | 4 |
| 6 | -87~-24 | 6 |
| 7 | 24~87 | 6 |
| 8 | -343~-88 | 8 |
| 9 | 88~343 | 8 |
| 10 | -1367~-345 | 10 |
| 11 | 345~1367 | 10 |
| 12 | -2047~-1368 | 10 |
| 13 | 1368~2047 | 10 |

| GROUP NO. | SF DIFFERENCE | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7~-4, 4~7 | 3 |
| 4 | -23~-8 | 4 |
| 5 | 8~23 | 4 |
| 6 | -31~-24 | 3 |
| 7 | 24~31 | 3 |

CONVENTIONAL SYSTEM 1

ILLUSTRATION OF
SCAN CONVERSION

AC COEFFICIENT GROUPING TABLE

| GROUP NO. | AC COEFFICIENT | NUMBER OF ADDITIONAL BITS |
|---|---|---|
| 1 | -1, 1 | 1 |
| 2 | -3, -2, 2, 3 | 2 |
| 3 | -7~-4, 4~7 | 3 |
| 4 | -15~-8, 8~15 | 4 |
| 5 | -31~-16, 16~31 | 5 |
| 6 | -63~-32, 32~63 | 6 |
| 7 | -127~-64, 64~127 | 7 |
| 8 | -255~-128, 128~255 | 8 |
| 9 | -511~-256, 256~511 | 9 |
| 10 | -1023~-512, 512~1023 | 10 |

FIG. 15
DC DIFFERENCE GROUPING TABLE
| GROUP NO. | DC DIFFERENCE | NUMBER OF ADDITIONAL BITS |
|---|---|---|
| 0 | 0 | 0 |
| 1 | −1, 1 | 1 |
| 2 | −3, −2, 2, 3 | 2 |
| 3 | −7∼−4, 4∼7 | 3 |
| 4 | −15∼−8, 8∼15 | 4 |
| 5 | −31∼−16, 16∼31 | 5 |
| 6 | −63∼−32, 32∼63 | 6 |
| 7 | −127∼−64, 64∼127 | 7 |
| 8 | −255∼−128, 128∼255 | 8 |
| 9 | −511∼−256, 256∼511 | 9 |
| 10 | −1023∼−512, 512∼1023 | 10 |
| 11 | −2047∼−1024, 1024∼2047 | 11 |
FIG. 18
ILLUSTRATION OF MACRO BLOCKS
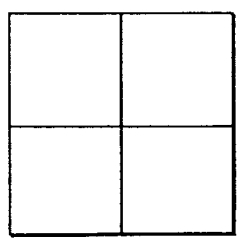
MACRO BLOCK
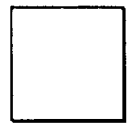
PIXEL BLOCK

FIG. 16

SCALE_CODE CONVERSION TABLE

| SCALE_CODE | Q_SCALE ||
|---|---|---|
| | linear | non-linear |
| 0 | (forbidden) ||
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

CONVENTIONAL SYSTEM 2

IMAGE CODING APPARATUS

BACKGROUND OF THE INVENTION

1. Field of the Invention

The present invention relates to an image coding apparatus which converts an image into frequency areas and codes the image by adaptively performing quantization.

2. Description of the Related Art

More gradations and higher resolution are required to obtain higher quality digital images. The capacity of images is represented as the product of the number of pixels and the number of gradation bits, which represents an enormous amount of information. Therefore, an image size is compressed to reduce costs of storage or transmission of images.

A variety of image coding systems are proposed. A typical one is JPEG (Joint Photographic Experts Group) Baseline system described in Pages 18 to 23 of "International Standards of Multimedia Coding" edited by Yasuda, published by Maruzen. This system will be explained using FIG. 12.

In FIG. 12, the reference numerals 1, 2, 3, 4, 5, 6, 7, 8, 9, 10, 11, 12, 13, 14, and 15 designate an input image, a blocking circuit, a DCT (discrete cosine transform) circuit, a quantizer, a quantization table, a scan converting circuit, a significant coefficient detecting circuit, a grouping circuit, a run length counter, a two-dimensional Huffman coding circuit, a DC difference calculating circuit, a grouping circuit, a one-dimensional Huffman coding circuit, a multiplexing circuit, and an output code, respectively.

In FIG. 12, an input image 1 is split into blocks (hereinafter called pixel blocks) of 8×8 pixels each by the blocking circuit 2. The pixel blocks are subjected to a DCT operation by the DCT circuit 3 and transform coefficients output as a result of the DCT operation are quantized by the quantizer 4 according to quantization step information stored in the quantization table 5. The quantized transform coefficients can be represented as an 8-by-8 matrix. Usually, the transform coefficients are arranged in the array so that the vertical coefficients correspond to higher-order DCT coefficients as they go downward and the horizontal coefficients correspond to higher-order DCT coefficients as they go toward the right. The leftmost and topmost of the 64 transform coefficients is called a DC component or DC coefficient because it corresponds to a DC frequency area of a DCT area. The other 63 are called AC components or AC coefficients because they correspond to AC frequency areas.

The DC difference calculating circuit 11 calculates a difference between the DC coefficient and a DC component of a preceding image block and sends it to the grouping circuit 12. The grouping circuit 12 calculates, from the DC difference value, a group number and additional bits shown in FIG. 15. The additional bits are used to identify a DC difference value within an identical group. The number of bits of the additional bits is shown in FIG. 15. The group number calculated in the grouping circuit 12 is converted into a Huffman code by the one-dimensional Huffman coding circuit 13. The additional bits are sent to the multiplexing circuit 14.

The AC coefficients quantized by the quantizer 4 are scan-converted in a zigzag scan order shown in FIG. 13 and are sent to the significant coefficient detecting circuit 7. The significant coefficient detecting circuit 7 judges whether the quantized AC coefficients are "0" or not, and when "0", supplies a count-up signal to the run length counter 9 to increment the counter value by one. When the AC coefficients are nonzero significant coefficients, the significant coefficient detecting circuit 7 supplies a reset signal to the run length counter 9 to reset the counter value and sends the AC coefficients to the grouping circuit 8.

The run length counter 9 counts the length of a run of "0"s. The number NNNN of "0"s between two significant coefficients is sent to the two-dimensional Huffman coding circuit 10. The grouping circuit 8 splits the AC coefficients into group numbers SSSS and additional bits shown in FIG. 14, and sends the group numbers to the two-dimensional Huffman coding circuit 10 and the additional bits to the multiplexing circuit 14. The additional bits are used to identify a DC difference value within an identical group. The number of bits of the additional bits is shown in FIG. 14.

The two-dimensional Huffman coding circuit 10 converts a combination of a run length NNNN and a group number SSSS into a Huffman code and sends it to the multiplexing circuit 14.

The multiplexing circuit 14 multiplexes a DC coefficient Huffman code of one pixel block, an AC coefficient Huffman code, DC coefficient additional bits, and AC coefficient additional bits and outputs code data 15.

This terminates a description of the JPEG Baseline coding system.

Furthermore, by changing the contents of the quantization table 5 of the standard image coding system described above, the following effects can be obtained:

(1) The amount of code of an input image can be controlled to a desired level.
(2) Quantization resistant to image degradation can be performed in accordance with the nature of an input image.

The above described two points will be described in more detail.

The first point will be described. When a quantization step width is small, the amount of code increases because probably the number of significant coefficients will increase and the absolute values of the significant coefficients will become large. Conversely, when a quantization step value is large, the amount of code decreases because probably a run length will increase due to a small number of significant coefficients and the absolute values of the significant coefficients will become small. By providing a basic quantization table and multiplying a quantization step value within the basic quantization table by a constant called a scaling factor, the value of quantization step width can be increased or decreased. When the amount of code is to be increased to enhance image quality, the scaling factor should be reduced. When the amount of code is to be reduced, the scaling factor should be set to a large value.

Generally, a larger amount of code makes image quality better and a smaller amount of code makes image quality worse. However, the limit of storage capacity and transmission capacity may limit the amount of code. In this case, the best image quality can be obtained by controlling the amount of code to a limit.

Numerous methods of calculating a scaling factor with the objective of controlling the amount of code as described above are proposed in Japanese Published Unexamined Patent Application Nos. Hei 7-107296 and Hei 7-212757, and the like.

These methods are used to obtain a scaling factor of an entire input image. However, when an image size is large, there are cases where it is necessary to split the image into smaller partial images and control the amount of code for each of the partial images. In this case, if the split partial image is viewed as one image, these methods are also applicable to the control of code amount for each of the partial images.

Next, the second point will be described. Usually, halftone images produced from photographs input through an image scanner or the like tend to be power-intensive in low-frequency portions of blocks subjected to a DCT operation. Accordingly, in order to reduce an error power after quantization, the quantization table 5 is organized to have small step widths for low frequencies of DCT coefficients and large step widths for high frequencies.

However, in the edge portion (a point where a sudden change of density values or brightness values is found) of an image, power is distributed also in high-frequency portions of blocks subjected to a DCT operation. As is already known, quantizing an edge portion with a quantization table for halftone images causes image distortion called mosquito noise. To suppress the occurrence of the image distortion, a quantization table suitable for each of image parts should be selected for quantization. Alternatively, without changing a quantization table, the amount of code can be increased by reducing a scaling factor in the edge portion of an image, whereby the occurrence of image distortion can be suppressed.

Numerous methods of analyzing input images to select a quantization table so as to prevent the occurrence of image distortion are proposed in Japanese Published Unexamined Patent Application No. Hei 5-103208, and the like. Also, numerous methods of analyzing input images to select a scaling factor so as to prevent the occurrence of image distortion are proposed in Japanese Published Unexamined Patent Application Nos. Hei 7-288809, Hei 6-98307, Hei 5-145773, and Hei 8-265769, and the like.

As described above, when a scaling factor is changed or a quantization matrix is selected for each of parts, scaling factors or quantization matrix selection information must be coded for each of the parts. Without a method of coding scaling factors, it would be impossible to perform image coding operations which actually change scaling factors.

How to code scaling factors is not described in the conventional systems proposed in Japanese Published Unexamined Patent Application Nos. Hei 7-107296 and Hei 7-212757, and the like. Also, how to code a selected quantization table is not described in the conventional methods proposed in Japanese Published Unexamined Patent Application No. Hei 5-103208 and the like. Furthermore, the systems described in Japanese Published Unexamined Patent Application Nos. Hei 7-288809, Hei 6-98307, Hei 5-145773, and Hei 8-265769, and the like have the same method of coding the scaling factors as the MPEG (Moving Picture Coding Experts Group) system.

Hereinafter, a description will be made of conventional systems for coding scaling factors or quantization matrix selection information.

Conventional systems for coding scaling factors or quantization matrix selection information include:
(1) JPEG Extended system
(2) MPEG System Hereinafter, the two conventional systems will be described.

The JPEG Extended system is described in ITU-T, T. 84, ISO/IEC 10918-3 (pages 32 and 33). This system makes it possible to change scaling factors for each pixel block. Coding is performed for each block in the following steps:

(S1): If a scaling factor is the same as that of a preceding block, the same coding as that of a normal JPEG system is performed.

(S2): If a scaling factor is different from that of a preceding block, in place of the code of DC difference, the code "QS_CHANGE" to indicate change of the scaling factor is generated. "QS_CHANGE" is followed by 5-bit information (SCALE_CODE) to indicate a scaling factor. Thereafter, the same coding as that of a normal JPEG system is performed. SCALE_CODE is 5-bit information as shown in FIG. 16, and either of the linear and non-linear tables is referenced to find a scaling factor (Q_SCALE). Letting a DCT coefficient be X, a basic quantization step S, and an quantization index Y, the quantization index is found by the following expression.

$$Y = X \times 16 / (S \times Q\_SCALE) \qquad \text{[Expression 1]}$$

Hereinafter, referring to FIG. 17, a description is further made of an example of the operation of a conventional system. In FIG. 17, the same portions in FIG. 12 use the same reference numerals and will not be described. The reference numeral 51 designates an AC component coding circuit, which integrates the scan converting circuit 6, significant coefficient detecting circuit 7, grouping circuit 8, run length counter 9, and two-dimensional Huffman coding circuit 10. 52 denotes a pixel value of an input block, DCT coefficient, or the like, 53 a scaling factor calculating circuit, 54 a basic quantization table, 55 a scaling factor, and 56 a basic quantization step.

The scaling factor calculating circuit 53 calculates a scaling factor 55 and sends it to the quantizer 4 and the multiplexing circuit 14, as do the foregoing conventional systems, that is, those described in Japanese Published Unexamined Patent Application Nos. Hei 7-107296, Hei 7-212757, Hei 7-288809, Hei 6-98307, Hei 5-145773, and Hei 8-265769, and the like. Input information 52 can be pixel value information itself, DCT coefficient, or other information. The basic quantization table 54, which stores quantization step values, sends a quantization step value 56 to the quantizer 4. The quantizer 4 finds a quantization index by the following expression, letting a DCT coefficient be X, a basic quantization step S, a quantization index Y, and a scaling factor Q.

$$Y = X \times 16 / (S \times Q) \qquad \text{[Expression 2]}$$

Furthermore, as described above, the multiplexing circuit 14, if the scaling factor is different from that of a preceding block, in place of the code of DC difference, generates the code "QS_CHANGE" to indicate change of the scaling factor. "QS_CHANGE" is followed by 5-bit information (SCALE_CODE) to indicate a scaling factor. Thereafter, the same code as that of a normal JPEG system is appended.

Next, the MPEG system is described. The MPEG standard, which is a moving picture coding system, comprises numerous systems such as a method of coding a plurality of components, and a method of coding different frames. Herein, a description is made of a system of coding scaling factors. The system of coding scaling factors can also be applied to the coding of static pictures.

In the MPEG system, an input image (frame) is split into pixel blocks of 8×8 pixels each. As shown in FIG. 18, a collection of a plurality of the split pixel blocks forms a macro block. Coding is performed for each macro block. A macro block type is appended as the header of a macro block. Macro block types fall into two categories, depending on whether QS is provided or not. The existence of QS indicates that a macro block type is followed by information (QS) for changing a scaling factor. The absence of QS indicates that information (QS) for changing a scaling factor is not provided. A macro block type is coded with a variable length. QS is the same as SCALE_CODE shown in FIG. 16 and is appended with five bits.

The MPEG system can also be described with reference to FIG. 17. The following description focuses on quantization by use of scaling factors and the coding of the scaling factors.

The scaling factor calculating circuit 53 calculates a scaling factor for each macro block. A calculating method can be performed as in the foregoing conventional systems, that is, those described in Japanese Published Unexamined Patent Application Nos. Hei 7-288809, Hei 6-98307, Hei 5-145773, and Hei 8-265769. The scaling factor 55 is sent to the quantizer 4 and the multiplexing circuit 14. Input information 52 can be pixel value information itself, DCT coefficient, or other information. The basic quantization table 54, which stores quantization step values, sends a quantization step value 56 to the quantizer 4. The quantizer 4 finds a quantization index by the following expression, letting a DCT coefficient be X, a basic quantization step S, a quantization index Y, and a scaling factor Q.

$$Y=X\times 16/(S\times Q) \quad \text{[Expression 3]}$$

Furthermore, the multiplexing circuit 14, when the scaling factor is different from that of a preceding macro block, generates, as a macro block type, a code indicating that QS is present, and appends 5-bit information (SCALE_CODE) indicating a scaling factor after that code. Thereafter, the macro block is coded. If the scaling factor is the same as that of a preceding block, a code indicating that QS is not present is generated, and thereafter the macro block is coded.

In the conventional systems, the higher the frequency with which scaling factors are changed, the more necessary it is to append scaling factor information to most pixel blocks or macro blocks. The amount of code will increase because of the large overhead.

Also, in the conventional systems, it has been impossible to code at the same time both information of scaling factor change and quantization matrix change information.

SUMMARY OF THE INVENTION

An object of the present invention is to achieve efficient coding by coding DC difference information and scaling factor information or quantization matrix change information, or scaling factor information and quantization matrix change information in combination.

The present invention makes coding more efficient by combined coding of DC difference values and scaling factors or quantization matrix selection information than by independent coding of them.

Hereinafter, the present invention will be described.

According to the present invention, in order to achieve the above object, an image coding apparatus is provided with an image splitting unit for splitting an input image; an orthogonal transformation unit for orthogonally transforming images split by the image splitting unit; a quantization step width control information output unit for outputting one or more types of quantization step width control information of the split images; a DC differential signal calculating unit for calculating a difference between a DC signal of signals orthogonally transformed by the orthogonal transformation unit and a DC signal of a split image split immediately before; and a DC differential signal and quantization step width control information coding unit for coding the DC differential signal and the one or more types of quantization step width control information, wherein the DC differential signal and quantization step width control information coding unit changes the code of the DC differential signal and at least one predetermined code of the respective codes of the one or more types of quantization step width control information in accordance with the value of the DC differential signal and at least one of the values of the one or more types of quantization step width control information which is not corresponding to the predetermined code(s).

The image splitting unit splits an input image into pixel blocks. The orthogonal transformation unit can split an input pixel block into DC components and AC components, such as discrete cosine transform (DCT), for example. The quantization step width control information denotes scaling factors, or quantization table selection information, and the like. The DC signal denotes DC coefficients in the case of DCT.

The DC differential signal and quantization step width control information coding unit may code DC differential signals and quantization step width control information singly as discrete codes or collectively as one code.

In this configuration, DC differential signals and quantization step width control information can be efficiently coded by expanding information sources or using the correlation between the information sources.

In this configuration, codes can be changed in the following states.

(1) Methods of coding scaling factors or quantization table selection information are switched by a DC difference value.

(2) Methods of coding DC difference values are switched by the value of a scaling factor or quantization table selection information.

(3) By the value of either of a scaling factor or quantization table selection information, methods of coding the other are switched.

(4) DC difference values, and scaling factors or quantization table selection information are collectively coded using the correlation among them.

The image coding apparatus, further provided with a basic quantization table storing unit, uses quantization step width control information as one variable numeric value and multiplies some or all values of a basic quantization table stored in the basic quantization table storing unit by the quantization step width control information, thereby calculating quantization step values used for quantization.

Briefly, quantization step control information can be used as a scaling factor. Multiplying some quantization step values of a basic quantization table stored in the basic quantization table storing unit by quantization step width control information means, for example, application of multiplication to only AC components but not to DC components.

The image coding apparatus, further provided with a basic quantization table storing unit for storing a plurality of basic quantization tables, can use, as quantization step width control information, information for selecting a quantization table used for quantization from a plurality of basic quantization tables stored in the basic quantization table storing unit. Briefly, quantization table selection information can be used as quantization step control information.

The DC differential signal and quantization step width control information coding unit can be configured to include a unit for grouping DC differential signals; a unit for degenerating N types of quantization step width control signals; and a multidimensional Huffman coding unit for converting a group number of DC differential signals and N types of quantization step width control degeneration signals degenerated by the quantization step width control signal degenerating unit into (N+1)-dimensional Huffman codes.

This configuration example intends to perform efficient coding taking advantage of the fact that the correlation is high between scaling factors and DC differences or the correlation between quantization table selection information and DC differences. For example, it is anticipated that a pixel block having a DC difference of 0 has almost the same nature as a preceding block. Accordingly, scaling factor difference information also will probably become 0. In two-dimensional Huffman coding, efficient coding can be performed by shortening codes which have a DC difference of 0 and scaling factor difference information of 0.

A quantization step width control degeneration signal is a signal generated by the following two types of processing, for example.

(S1): Calculate a difference between the scaling factor of a pixel block to be coded and the scaling factor of a preceding pixel block.

(S2): Group scaling factors like DC difference values and AC coefficients, split the scaling factors into a group number and additional bits, and convert the group number into a variable-length code.

The DC differential signal and quantization step width control information coding unit can be configured to include a DC differential signal threshold comparing unit; a DC differential signal coding unit; a quantization step width control signal degenerating unit; and a quantization step width control degeneration signal coding unit, wherein the quantization step width control degeneration signal coding unit performs variable-length coding while switching coding tables for coding quantization step width control degeneration signals, depending on a magnitude relation between the absolute value of a DC differential signal and a predetermined threshold value.

This configuration example takes advantage of the fact that the probability of the occurrence of the difference values of scaling factors and the difference values of quantization table selection information is different depending on DC difference values. For example, if a DC difference value is small, by using a coding table assuming that the difference values of scaling factors and the difference values of quantization table selection information are small, efficient coding is performed. If variable-length coding is Huffman coding, coding tables refer to Huffman tables.

The DC differential signal and quantization step width control information coding unit is configured to include a DC differential signal coding unit; a unit for detecting the states of N types of quantization step width control signals; a quantization step width control signal degenerating unit; and a quantization step width control degeneration signal coding unit, wherein the unit for detecting the states of N types of quantization step width control signals judges whether or not a quantization step width control signal is in a predetermined state. The DC differential signal coding unit performs variable-length coding while switching $2^N$ types of coding tables, depending on in which of the two states N types of quantization step width control signals are. The quantization step width control degeneration signal coding unit, without coding a quantization step width control signal when it is in a predetermined state, codes the quantization step width control degeneration signal when the quantization step width control signal is not in a predetermined state.

In this configuration example, when a scaling factor is unchanged from that of a preceding block, no scaling factor information is appended and the efficiency of coding DC difference values can be increased.

A state of quantization step width control signal refers to, for example, a case where a scaling factor changes, or a case where it is unchanged. Another example is a case where quantization table selection information is 0 and a case where it is not 0.

A predetermined state refers to a state which will occur more frequently, of two states, such as a state in which a scaling factor is unchanged, or a state in which quantization table selection information is 0.

Specifically, two types of DC difference codes, one for a case where a scaling factor changes, and the other for a case where a scaling factor is unchanged, are provided to perform coding. In the case where scaling factors are unchanged, scaling factor information is not appended to codes. During decoding, it can be judged by DC difference codes whether or not a scaling factor is appended to codes.

The DC differential signal coding unit performs variable-length coding while switching $2^N$ types of coding tables, depending on whether N types of quantization step width control signals are the same or different. All the $2^N$ types of codes must exist in one type of code tree.

The quantization step width control signal degenerating unit can be configured to include a quantization step width control differential signal calculating unit. Specifically, differences between scaling factors are calculated and converted into variable-length codes.

Also, the quantization step width control signal degenerating unit can be configured to include a unit for grouping quantization step width control signals or quantization step width control differential signals. Specifically, scaling factors or scaling factor differences are grouped and the groups are converted into variable-length codes.

It is, of course, possible that differences between scale factors are calculated and grouped, and the groups are converted into variable-length codes.

The quantization step width control signal degenerating unit can also be configured to output quantization step width control signals without modifications. For example, the values themselves of scaling factors are coded.

The unit for grouping DC differential signals or the unit for grouping quantization step width control differential signals can also be configured to put a signal in a different group for a case where a difference value of the signal is positive and a case where it is negative. Correlation coefficients of DC differences and scaling factor differences are different for a case where DC difference values or scaling factor difference values are positive and a case where they are negative. By changing groups depending on whether they are positive or negative, the correlation can be used additionally. Conventionally, if absolute values are the same, the signals have been put in the same group.

The unit for grouping DC differential signals or the unit for grouping quantization step width control differential signals can also be configured to put small portions of the absolute value of a signal in an identical group regardless of whether the signal value is positive or negative, and put large portions of the absolute value of the signal in a different group for a case where the difference value of the signal is positive and a case where it is negative. For small portions of the absolute value of DC difference, it is anticipated that correlation values are unchanged regardless of whether the DC difference value is positive or negative. In this case, since it is useless to put the absolute value in different groups, small portions of the absolute value are put in an identical group.

According to the present invention, to achieve the above described object, an image coding apparatus is provided with an image splitting unit for splitting an input image; an orthogonal transformation unit for orthogonally transforming images split by the image splitting unit; a quantization step width control information output unit for outputting one or more types of quantization step width control information of the split images; a coding unit for coding signals orthogonally transformed by the orthogonal transformation unit; and a quantization step width control information coding unit, wherein the quantization step width control information coding unit includes a quantization step width control information change pattern creation unit for judging whether or not N types of quantization step width control signals have changed; a quantization step width control information change pattern coding unit for converting a quantization step width control information change pattern created by the quantization step width control information change pattern creation unit into variable-length codes; and a unit for coding N types of quantization step width control signals that, only when individual quantization step width control signals have changed, codes the quantization step width control signal.

In this configuration, since a plural items of quantization table control information are coded in such a way that only changed information is coded, efficient coding can be performed. Of course, efficient coding can be performed by expanding information sources or using the correlation between the information sources.

BRIEF DESCRIPTION OF THE DRAWINGS

FIG. 3 is an illustration of an SF difference grouping table of the present invention.

FIG. 4 is a two-dimensional Huffman coding table of the present invention.

FIG. 5 is an illustration of an occurrence frequency distribution of SF difference groups and DC difference groups of the present invention.

FIG. 6 is an illustration of three-dimensional Huffman coding tables used in FIG. 2.

FIG. 10 is an illustration of the output patterns of FIG. 5.

FIG. 11 is an illustration of grouping of DC differences related to a sixth embodiment of the present invention.

FIG. 15 is an illustration of a DC difference grouping table related to the conventional system.

FIG. 16 is an illustration of a SCALE_CODE conversion table related to the conventional system.

FIG. 18 is an illustration of macro block related to another conventional system.

DESCRIPTION OF THE PREFERRED EMBODIMENTS

Embodiments of the present invention will be hereinafter described.

[First Embodiment]

In this embodiment, there is shown an apparatus for performing efficient coding by using the correlation between groups of scaling factor differences and groups of DC differences. Specifically, two-dimensional Huffman codes are generated for groups of scaling factor differences and groups of DC differences.

Figure 1:
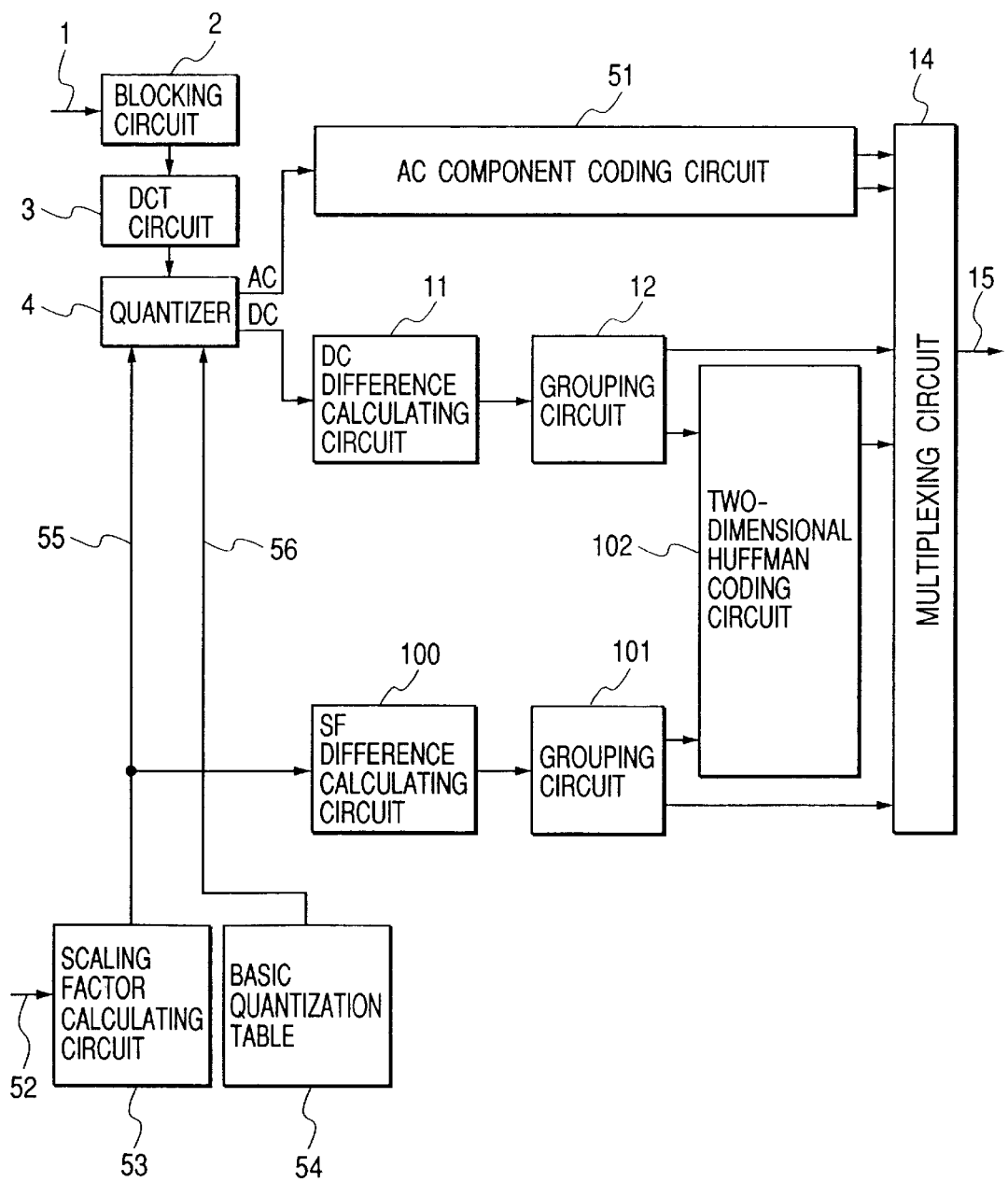
FIG. 1 is a block diagram showing the configuration of a first embodiment of the present invention.

The embodiment is described using FIG. 1. In FIG. 1, identical numbers are assigned to reference numerals already referred to, which are not described herein. In FIG. 1, the reference numeral 100 designates an SF difference calculating circuit that calculates a difference (hereinafter called an SF difference) between the scaling factor of a preceding coded block and the scaling factor of a pixel block to be newly coded, 101 a group circuit for grouping SF differences, and 102 a two-dimensional Huffman coding circuit for converting DC difference groups and SF difference groups into two-dimensional Huffman codes. Other components are configured as described in the conventional systems and perform similar operations.

An input image 1 is split into blocks of 8×8 pixels each by a blocking circuit 2. The pixel blocks are subjected to a DCT operation by a DCT circuit 3 and transform coefficients output as a result of the DCT operation are quantized by a quantizer 4 according to quantization step information stored in a quantization table 5.

A difference between a DC coefficient in a pixel block to be newly coded and a DC coefficient in a preceding image block is calculated in a DC difference calculating circuit 11 and sent to a grouping circuit 12. The grouping circuit 12 calculates, from the DC difference value, a group number and additional bits shown in FIG. 15. The additional bits are used to identify a DC difference value within an identical group. The number of bits of the additional bits is shown in FIG. 15. The additional bits are sent to the multiplexing circuit 14. The group number is sent to a two-dimensional Huffman coding circuit 102.

Figure 12:
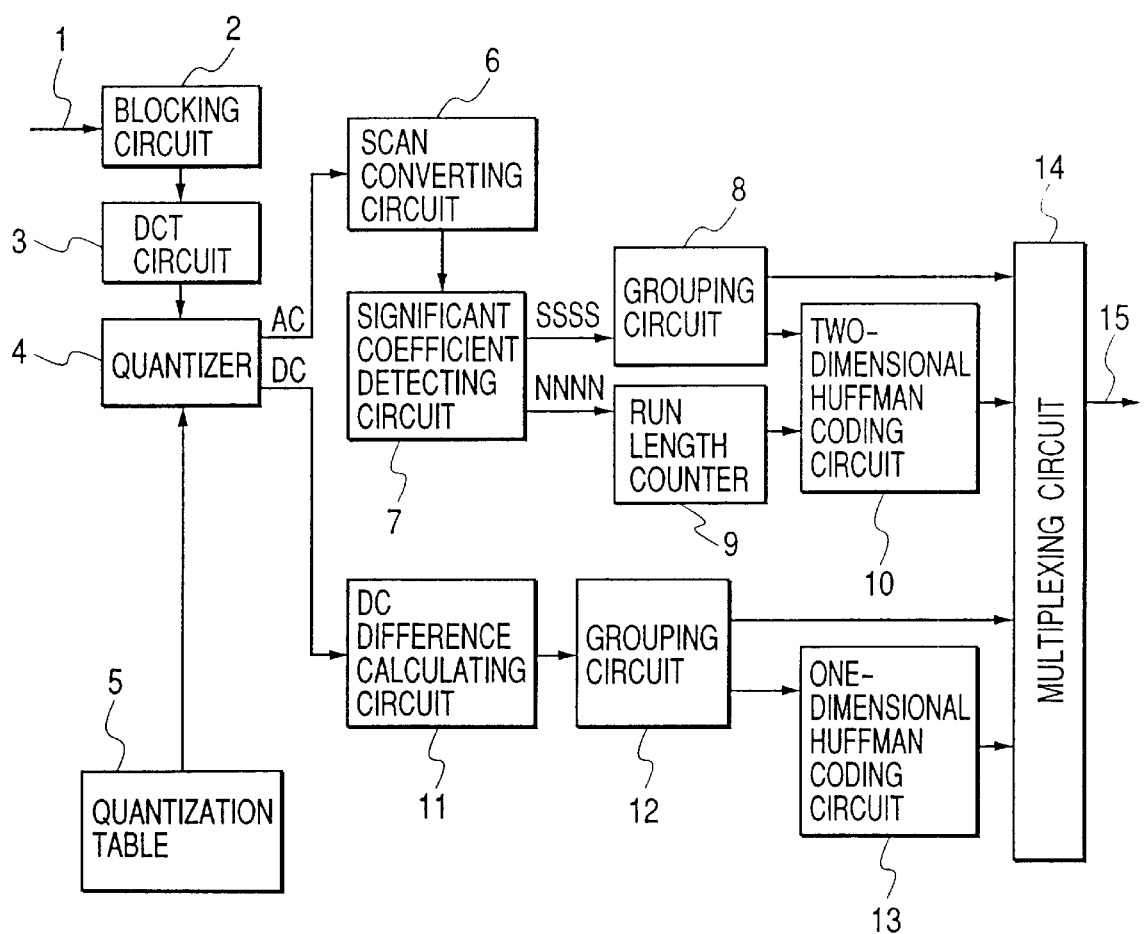
FIG. 12 a block diagram for explaining a conventional system.
Figures 13, 14:
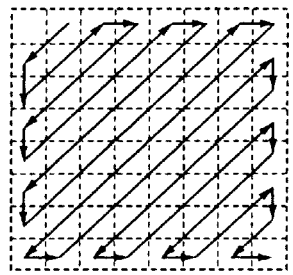
FIG. 13 is an illustration of scan conversion related to the conventional system.
FIG. 14 is an illustration of an AC coefficient grouping table related to the conventional system.
Figure 17:
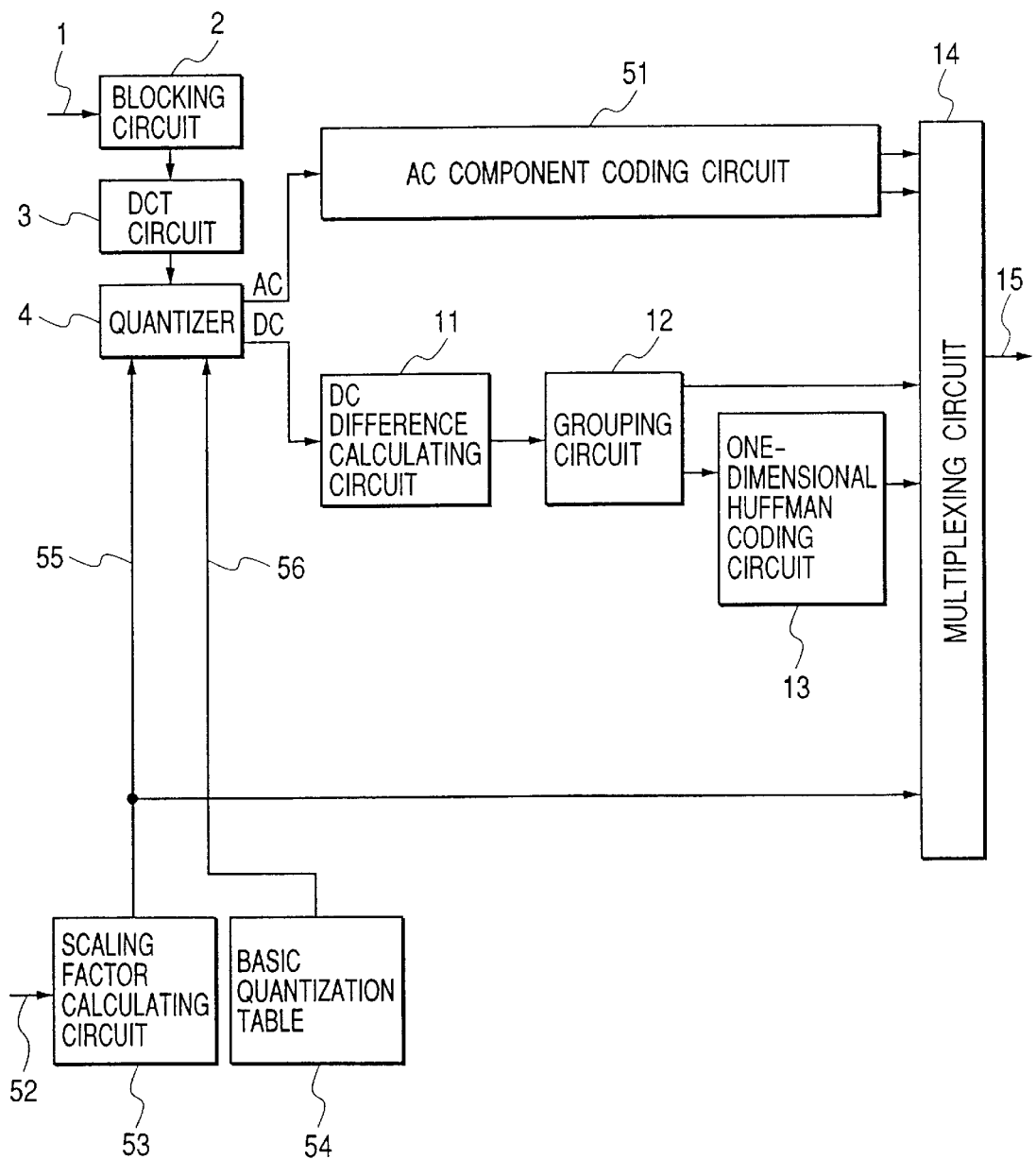
FIG. 17 is a block diagram for explaining another conventional system.

An AC coefficient quantized in the quantizer 4 is coded in an AC component coding circuit 15 that performs the same operation as the conventional systems described in FIG. 12.

A scaling factor calculating circuit 53 calculates a scaling factor 55 for each block by various methods such as the conventional methods and sends it to the quantizer 4 and the SF difference calculating circuit 100. The quantizer 4 multiplies the basic quantization table by the scaling factor to calculate a quantization step width for quantization. The SF difference calculating circuit 100 keeps a scaling factor of a preceding coding pixel block, and calculates a difference between the scaling factor of a preceding coding pixel block and a scaling factor of a pixel block to be newly coded. The SF difference is sent to the grouping circuit 101. Herein, a scaling factor is defined to be a 5-bit integer value. An SF difference can be represented as a 6-bit integer. The grouping circuit 101 splits an SF difference into a group number from 0 to 5 and additional bits of 0 to 5 bits as shown in FIG. 3. The additional bits are sent to the multiplexing circuit 14. The group number is sent to the two-dimensional Huffman coding circuit 102.

To the two-dimensional Huffman coding circuit 102 are input a group number of DC difference and a group number of SF difference, which are converted into two-dimensional Huffman codes. As shown in the table of FIG. 4, Huffman codes are assigned to all combinations of DC differences and SF differences to perform coding.

Moreover, the multiplexing circuit 14 multiplexes Huffman codes and additional bits of AC component groups, Huffman codes of DC differences and SF differences, and additional bits of DC differences, and additional bits of SF differences, thus outputting codes 15.

According to this embodiment, coding is efficiently performed when a correlation exists between DC difference group numbers and SF difference group numbers. Although, in the conventional systems, change of a scaling factor always requires addition of the number of bits corresponding to the scaling factor, in this embodiment, the amount of code can be reduced because code length can be shortened when the probability of occurrence of combinations of DC difference group numbers and SF difference group numbers is high.

FIG. 5 shows the frequencies of occurrence of SF difference groups and DC difference groups.

In the conventional systems, DC differences and SF differences are coded independently. Although SF differences are converted into fixed-length codes in the conventional systems, if SF is optimized in this embodiment to be also converted into variable-length codes, the entropy of DC difference groups and the entropy of SF difference groups plus the number of additional bits gives the code length of DC components and SF. (Comparisons are not made herein with systems in which QS_Change codes are appended when SF changes, because the amount of code increases further.) Hereinafter, comparisons will be made in terms of the entropy of DC differences and SF differences, assuming that the number of additional bits is the same between the conventional systems and the present invention.

In the case of the occurrence probabilities of FIG. 5, in the conventional systems which independently code DC differences and SF differences, a total of 5.78 bits, 3.32 bits for the entropy of DC differences and 2.46 for the entropy of SF differences are required. In the present invention, codes are assigned to all combinations of DC differences and SF differences. At this time, the entropy is 4.66 bits.

Consequently, in the example of FIG. 5, the amount of code can be reduced by about 20 percent.

[Second Embodiment]

Grouping is not required when the number of bits of a scaling factor is small.

In this embodiment, a description is made of coding a plurality of pieces of quantization step width control information. Specifically, SF difference groups, quantization table selection information, and DC difference groups are converted into three-dimensional Huffman codes. As an example of not performing grouping, quantization table selection information is shown.

Figure 2:
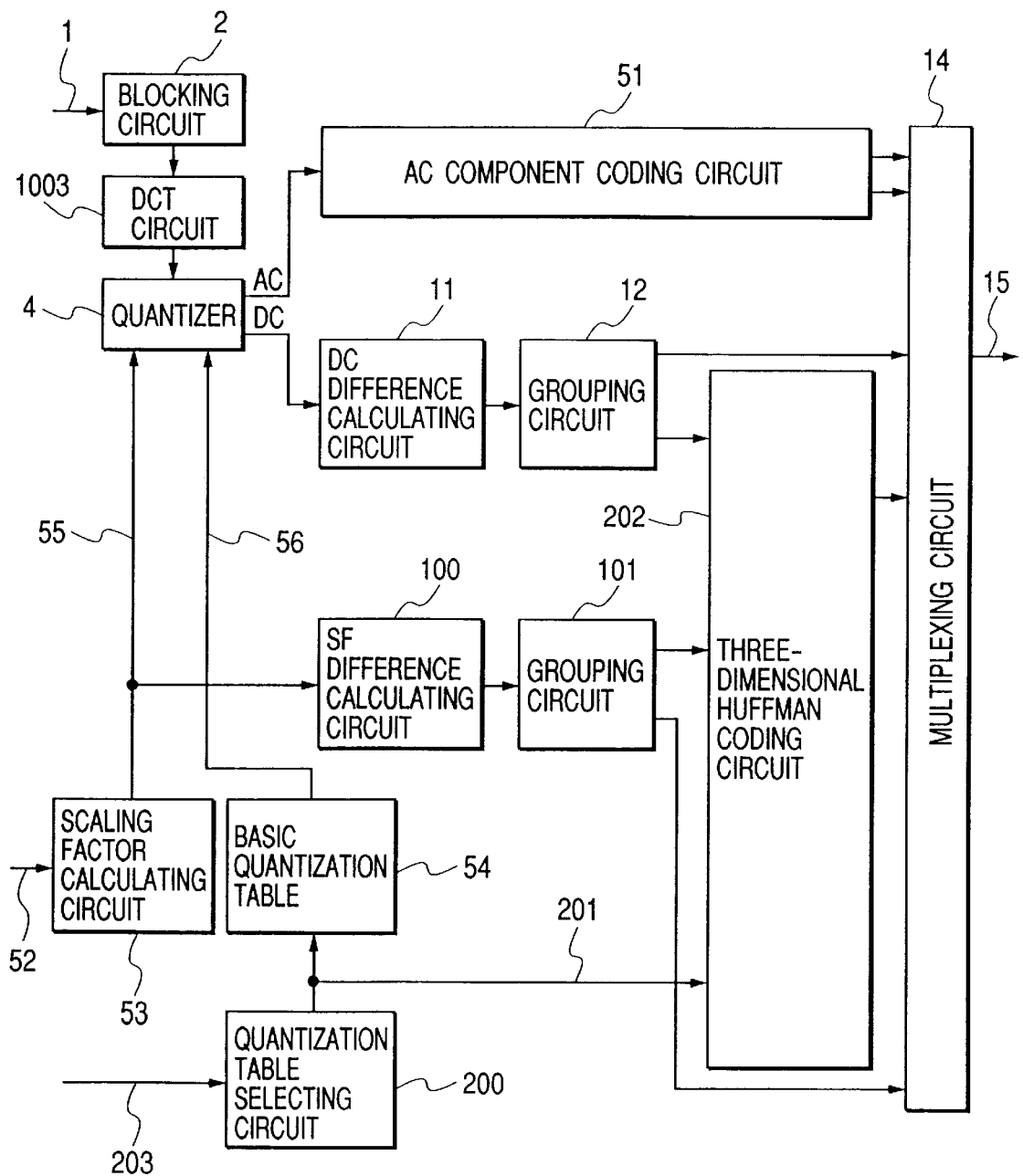
FIG. 2 is a block diagram showing the configuration of a second embodiment of the present invention.

A description is made using FIG. 2. FIG. 2 shows pixel values of input blocks or DCT coefficients 203, a quantization table selection circuit 200, and a quantization table selection information 201 in addition to the components of FIG. 1, and a three-dimensional Huffman coding circuit 202 as a Huffman coding circuit.

In the second embodiment, like the first embodiment, DCT operations, scaling factor calculation, grouping of DC differences and SF differences, and coding of AC coefficients are performed.

Furthermore, in the second embodiment, pixel values of input blocks or DCT coefficients 203 are input to the quantization table selection circuit 200. In the quantization table selection circuit 200, as in the conventional systems, a basic quantization table used for each block is selected. The selected basic quantization table is sent to the quantization table 54 as quantization table selection information 201, and a quantization table used for quantization is selected using the information 201. The quantizer 4 calculates a quantization step by multiplying the selected quantization table and a scaling factor, and performs quantization.

This embodiment assumes that the quantization table has double sides and quantization table selection information consists of one bit.

The quantization table selection information 201 is sent to the three-dimensional Huffman coding circuit 202. The three-dimensional Huffman coding circuit 202 converts DC differences, SF differences, and the quantization table selection information 201 into three-dimensional Huffman codes.

Figure 6:
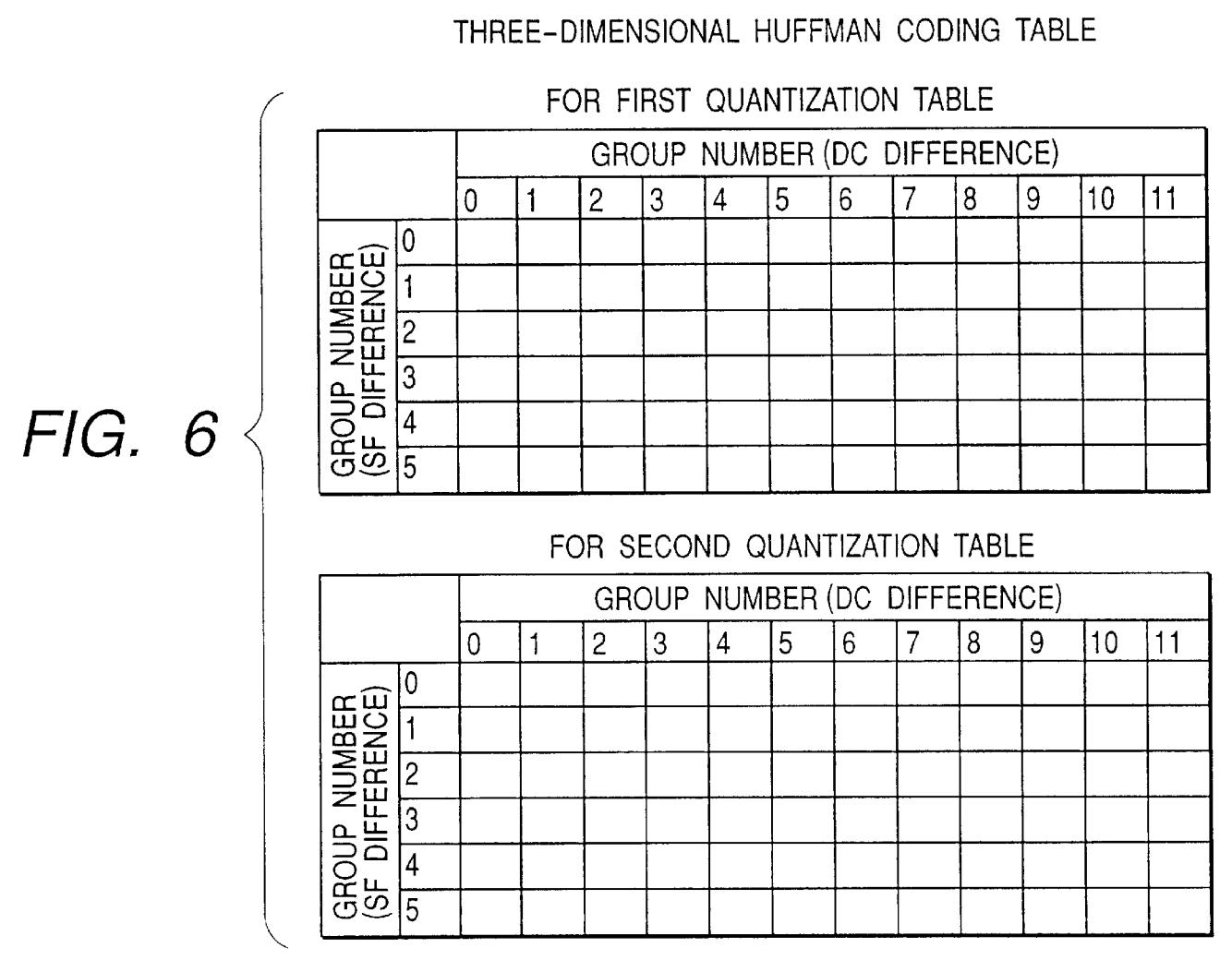

The three-dimensional Huffman coding circuit 202, as shown in FIG. 6, provides codes of all combinations of DC differences and SF differences for each quantization table. Codes of all quantization tables, and combinations of DC differences and SF differences should be uniquely decodable codes belonging to the same code tree.

The multiplexing circuit 14 outputs a code 15 by multiplexing Huffman codes and additional bits of AC component groups, Huffman codes of DC differences, SF differences, and quantization table selection information, additional bits of DC differences, and additional bits of SF differences.

If the number of bits of the quantization table selection information is great, the quantization table selection information may be grouped.

In the second embodiment, the amount of code can be reduced as in the first embodiment.

[Third Embodiment]

In this embodiment, unlike the first or second embodiment, DC differences and SF differences are coded independently of each other to reduce the amount of calculation. However, in order to use the correlation between DC differences and SF differences, a coding table for scaling factor difference groups is changed, depending on a magnitude relation between DC differences and a threshold value.

Figure 7:
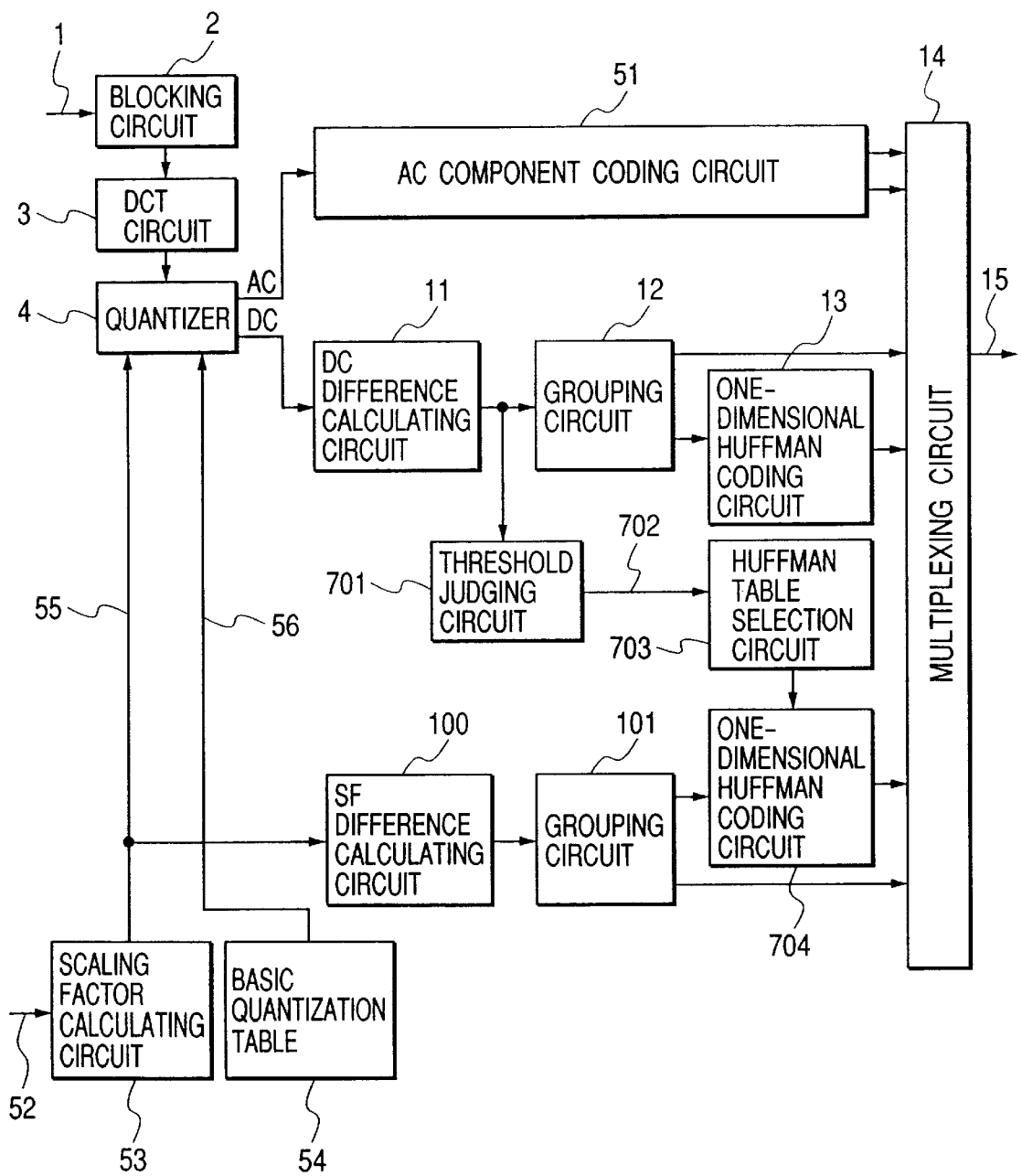
FIG. 7 is a block diagram showing the configuration of a third embodiment of the present invention.

A description will be made using FIG. 7. A description of reference numerals already referred to is omitted. In FIG. 7, the reference numerals 701, 702, 703, and 704 designate a threshold judging circuit, threshold judgement results, a Huffman table selection circuit, and one-dimensional Huffman coding circuit, respectively.

In the third embodiment, like the first embodiment, DCT operations, calculation and quantization of scaling factors, grouping of DC differences and SF differences, and coding of AC coefficients are performed.

DC difference groups grouped in the grouping circuit 12 are sent to the one-dimensional Huffman coding circuit 13 and are converted into Huffman codes. SF difference groups grouped in the grouping circuit 101 are sent to the one-dimensional Huffman coding circuit 704. A DC difference calculated in the DC difference calculating circuit 11 is also sent to the threshold judging circuit 701. The threshold judging circuit 701 compares a predetermined threshold value with the absolute value of the DC difference and sends a magnitude relation therebetween to the Huffman table selection circuit 703. The Huffman table selection circuit 703, provided with two types of Huffman tables, selects different tables between when the absolute value of DC difference is greater than or equal to the predetermined threshold value, and when the absolute value of DC difference is smaller than a predetermined threshold value, and sends the selected one to the one-dimensional Huffman table coding circuit 704. The one-dimensional Huffman table coding circuit 704 converts SF difference groups into one-dimensional Huffman codes by using the selected Huffman table.

The multiplexing circuit 14 outputs a code 15 by multiplexing Huffman codes and AC component additional bits of AC component groups, Huffman codes of DC difference groups, additional bits of DC differences, Huffman codes of SF difference groups, and additional bits of SF differences.

The threshold judging circuit 701 selects different Huffman tables between when the absolute value of DC difference is greater than or equal to a predetermined threshold value, and when the absolute value of DC difference is smaller than a predetermined threshold value. However, of course, the threshold judging circuit 701 may select different Huffman tables between when the absolute value of DC difference is greater than a predetermined threshold value, and when the absolute value of DC difference is smaller than or equal to a predetermined threshold value.

During decoding, a check is made between DC differences and a threshold value, and SF difference information may be decoded to Huffman codes by switching Huffman tables of SF difference information using the result of the threshold checking.

Effects of this embodiment are described based on the example of FIG. 5. In the conventional systems which independently code DC differences and SF differences, a total of 5.78 bits, 3.32 bits for the entropy of DC differences and 2.46 for the entropy of SF differences are required.

In the present invention, codes of SF differences are switched between small portions and large portions of DC differences. A threshold value is set between DC difference groups 5 and 6. Coding of SF differences is changed between DC difference groups 0 to 5 and 6 to 11. Since the entropy of DC differences is 3.32 bits, the entropy of SF differences of DC difference groups 0 to 5 is 2.02 bits, and the entropy of SF differences of DC difference groups 6 to 11 is 0.21 bits, a total of 5.55 bits are required. For the occurrence probabilities of FIG. 5, the amount of code can be reduced about 4 percent.

[Fourth Embodiment]

Like the third embodiment, in order to reduce the amount of calculation, DC differences and SF differences are coded independently of each other. However, when there are many SF differences of 0, to avoid an increase of the amount of code due to addition of the SF differences, codes of DC differences are changed depending on whether SF differences are 0 or not, whereby the SF differences are not coded when they are 0.

Figure 8:
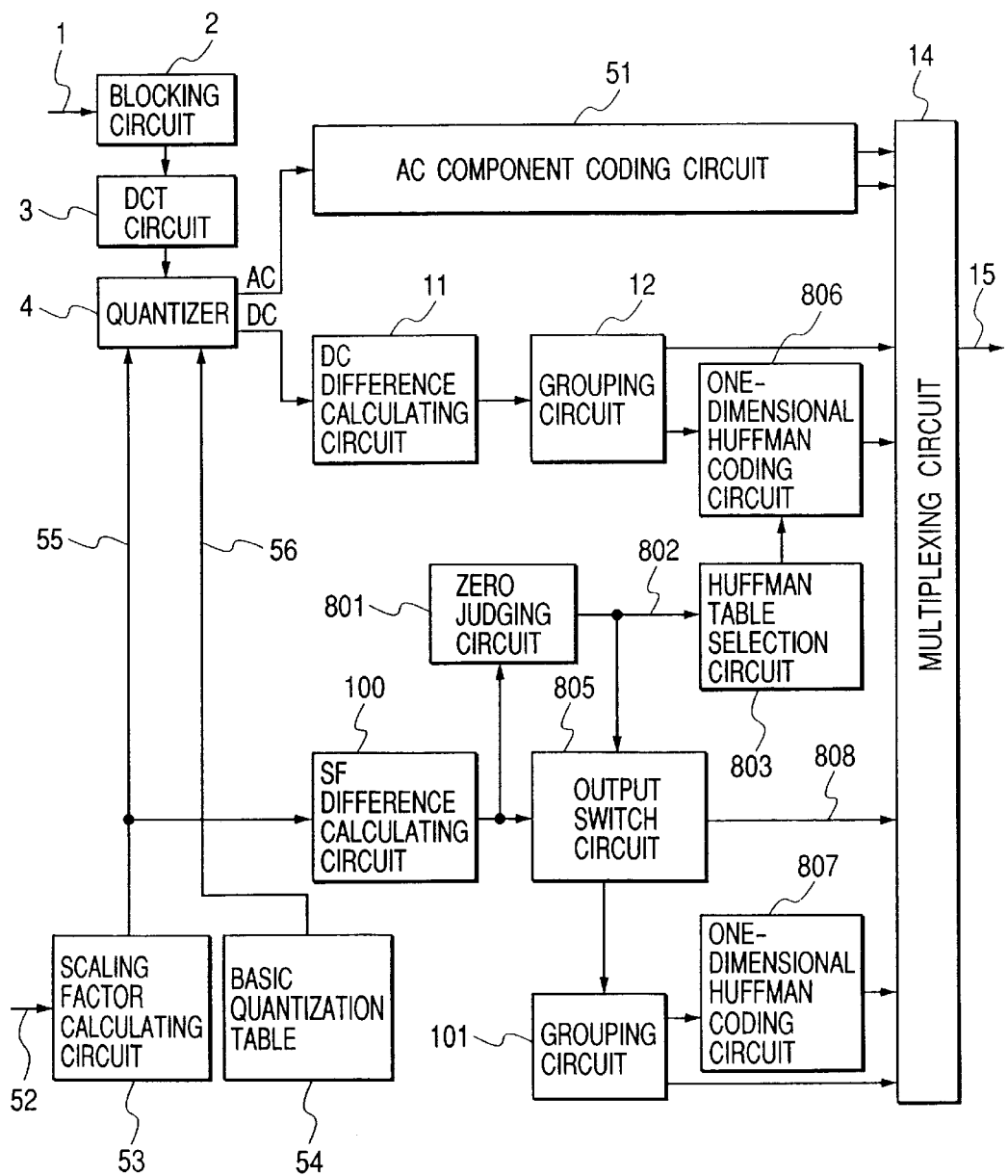
FIG. 8 is a block diagram showing the configuration of a fourth embodiment of the present invention.

The operation of the fourth embodiment is described using FIG. 8. In FIG. 8, the reference numeral 801 designates a zero judging circuit, 802 zero judgment results, 803 a Huffman table selection circuit, 805 an output switch circuit, 806 a one-dimensional Huffman coding circuit for coding DC differences, and 807 a one-dimensional Huffman coding circuit for coding SF differences.

In the fourth embodiment, like the first embodiment, DCT operations, calculation and quantization of scaling factors, grouping of DC differences and SF differences, and coding of AC coefficients are performed. DC difference groups grouped in the grouping circuit 12 are sent to the one-dimensional Huffman coding circuit 806. Additional bits are sent to the multiplexing circuit 14.

SF differences calculated in the SF difference calculating circuit 100 are also sent to the zero judging circuit 801. The zero judging circuit 801 judges whether the SF differences are 0, and sends judgement results to the Huffman table selection circuit 803 and the output switch circuit 805. The Huffman table selection circuit 803, provided two types of Huffman tables, selects different Huffman tables, depending on whether the SF differences are 0 or not, and sends the selected one to the one-dimensional Huffman table coding circuit 806. The two Huffman tables used at this time consists of one tree of codes, which can be uniquely decoded during decoding. The one-dimensional Huffman coding circuit 806 codes DC difference groups by using the selected Huffman table and sends the results to the multiplexing circuit 14. The output switch circuit 805 does not code the SF differences when they are 0. When the SF differences are not 0, the output switch circuit 805 sends them to the grouping circuit 101. The output switch circuit 805 sends, to the multiplexing circuit 14, SF difference output information 808 indicating whether the SF differences are coded. The grouping circuit 101 groups the SF differences and sends created groups to the one-dimensional Huffman coding circuit 807 and additional bits to the multiplexing circuit 15.

The multiplexing circuit 14 outputs a code 15 by multiplexing AC component groups and AC component additional bits, Huffman codes of DC difference groups, additional bits of DC differences, Huffman codes of SF difference groups, and additional bits of SF differences. However, the multiplexing circuit 14, based on SF difference output information 808, does not multiplex Huffman codes of SF difference groups and additional bits of SF differences when the SF differences are 0.

During decoding, it can be judged by decoding DC differences whether SF differences have been coded. When the SF differences have been coded, the SF differences are decoded into Huffman codes, and otherwise decoding is performed with the SF differences regarded as 0.

Although there is shown in this embodiment an example of one type of quantization step width control information, that is, only scaling factors, there can also exist a plurality of types of pieces of quantization step width control information. For each of N types of quantization step width control information, for example, a one-dimensional Huffman coding circuit is provided, and $2^N$ Huffman tables of DC differences may be provided depending on whether individual pieces of the quantization step width control information are 0.

Effects of the occurrence probabilities of FIG. 5 will be obtained. In the conventional systems, at least one bit is required to identify whether SF codes are appended. Since the entropy of DC difference information is 3.31 bits, a total of 4.31 bits are required. In this embodiment, information indicating whether SF components are appended is contained in a code of DC difference information. The entropy at this time is a total of 3.72 bits, 0.51 bits as the entropy of SF difference 0 and 3.21 bits as the entropy as other than SF difference 0. A coding system of this embodiment has the effect of reducing the amount of code about 14 percent, compared to the conventional systems.

[Fifth Embodiment]

A description will be made of an embodiment of a method of coding two types of quantization step width control information. In this embodiment, efficiency of coding is improved by coding scaling factors and quantization table selection information in combination. By coding a pattern indicating whether a scaling factor has changed or not, and a pattern indicating whether quantization table selection information is 0 or not, coding of quantization step width control information is performed only when required. There is shown in the conventional systems only a method of coding one type of quantization step width control information.

Figure 9:
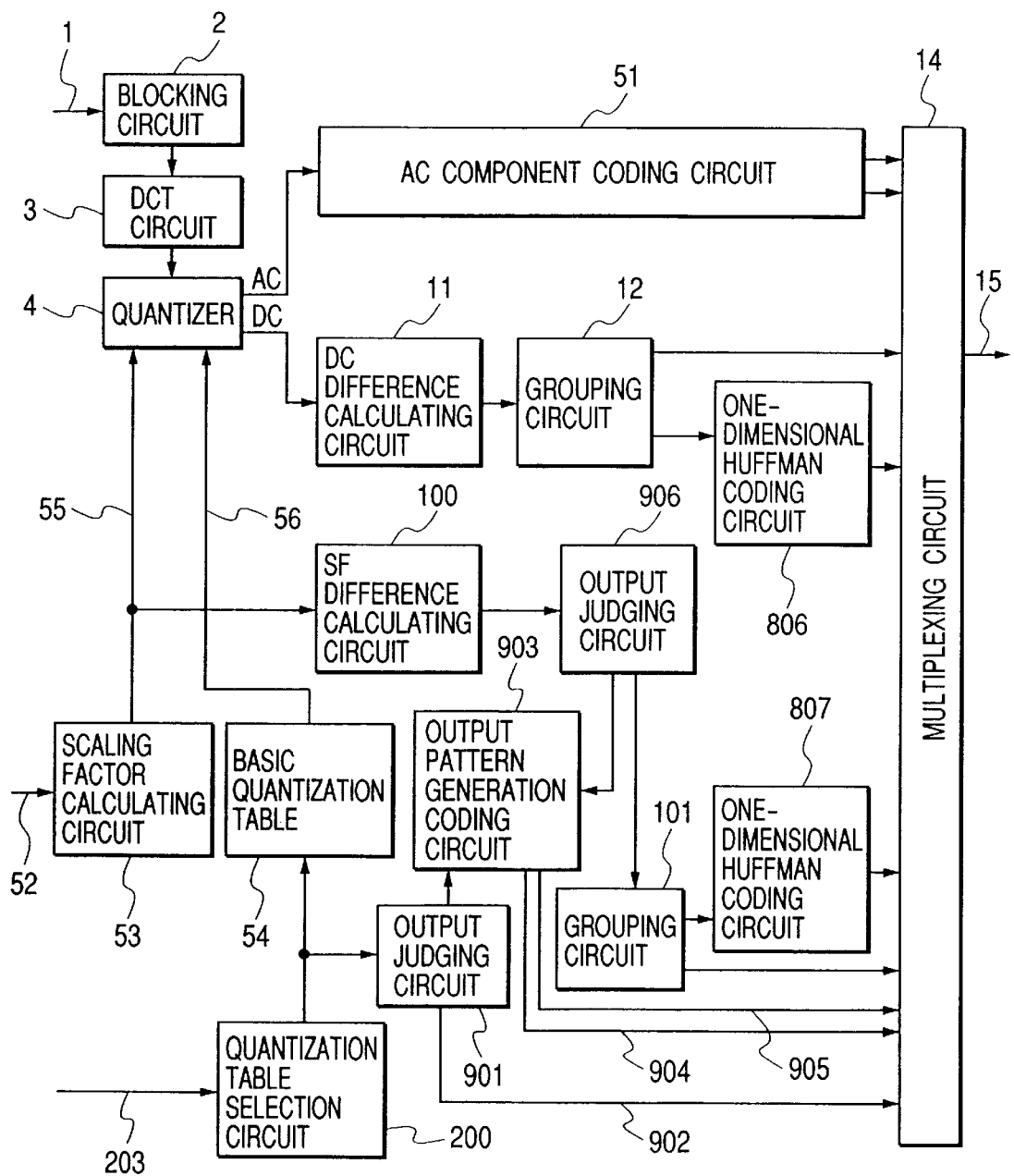
FIG. 9 is a block diagram showing the configuration of a fifth embodiment of the present invention.

This operation of the fifth embodiment is described using FIG. 9. In FIG. 9, the reference numeral 901 designates a circuit for judging the output of quantization table selection information, 902 quantization table selection information, 903 an output pattern generation coding circuit, 904 output pattern codes, 905 output patterns, and 906 a circuit for judging the output of SF differences.

In the fifth embodiment, like the first embodiment, DCT operations, calculation of scaling factors, grouping of DC differences and SF differences, and coding of AC coefficients are performed. Also, in the fifth embodiment, selection and quantization of quantization tables are performed like the second embodiment.

The operation of the fifth embodiment is further described. In FIG. 9, it is judged in the output judging circuit 906 whether SF differences calculated in the SF difference calculating circuit 100 are 0, and information indicating whether they are 0 or not is input to the output pattern generation coding circuit 903. The output judging circuit 906, when SF differences are not 0, sends them to the grouping circuit 101, which groups the SF differences and splits them into groups and additional bits. The groups are coded in the one-dimensional Huffman coding circuit 807 and are input to the multiplexing circuit 14. The additional bits are also input to the multiplexing circuit 14.

Similarly, it is judged in the output judging circuit 906 whether a quantization table number selected in the quantization table selection circuit 200 is 0, and information indicating whether it is 0 or not is input to the output pattern generation coding circuit 903. The output judging circuit 906, when quantization table selection information is not 0, inputs it to the multiplexing circuit 14.

The output pattern generation coding circuit 903 generates, as output patterns 905, 2-bit patterns indicating whether an SF difference and quantization table selection information are 0 or not, and sends the output patterns 905 to the multiplexing circuit 14. For example, the patterns shown in FIG. 10 are generated. The output pattern generation coding circuit 903 outputs the output patterns with variable-length codes, as shown in FIG. 10.

The multiplexing circuit 14 outputs a code 15 by multiplexing AC component groups and AC component additional bits, Huffman codes of DC difference groups, additional bits of DC differences, Huffman codes of SF difference groups, additional bits of SF differences, and quantization table selection information. However, the multiplexing circuit 14, based on information of output pattern 905, does not multiplex Huffman codes of SF difference groups and additional bits of SF differences when the SF differences are 0. The quantization table selection information is not multiplexed when it is 0.

Although quantization table selection information has been coded without modification, alternatively, a difference between pieces of the quantization table selection information may be calculated to determine whether to multiplex the quantization table selection information, depending on whether the quantization table selection information difference is 0 or not.

[Sixth Embodiment]

An embodiment is described which changes the grouping method in the above described embodiment to provide further efficiency. A description is made of a case where a grouping method is applied particularly to the first embodiment.

Although grouping shown in FIG. 3 or 15 was performed in the first embodiment, since it is not always true that, if absolute value are the same, correlation is also the same, a different grouping method is conceivable.

For example, when a DC difference is positive, if an SF difference is also probably positive, it is advantageous to change groups, depending on whether a difference value is positive or negative.

Small portions of absolute values are put in the same group, assuming that correlation between positive and negative values is small.

In this manner, in this embodiment, the grouping in the first embodiment is changed to the grouping of FIG. 11, for example.

Generally, coding efficiency can be improved by expanding information sources. According to the present invention, coding efficiency can be improved by expanding information sources through multidimensional Huffman coding by combinations of quantization step width control information and DC difference signals and using the correlation between the information sources. As has been described in the embodiments, as one example, the amount of code of DC difference information plus quantization step width control information can be reduced from 5.78 bits to 4.66 bits.

Coding efficiency can be improved by expanding information sources by combinations of a magnitude relation between DC difference signals and predetermined threshold values and quantization step width control information, and using the correlation between the information sources. As has been described in the embodiments, as one example, the amount of code of DC difference information plus quantization step width control information can be reduced from 5.78 bits to 5.55 bits.

Coding efficiency can be improved by expanding information sources by combining information indicating whether quantization step width control information is 0 or not, and DC difference signals, and using the correlation between the information sources. As has been described in the embodiments, as one example, the amount of code of DC difference information plus information indicating whether to append quantization step width control information can be reduced from 4.31 bits to 3.72 bits.

Moreover, when there are a plurality of pieces of quantization step width control information, coding efficiency can be improved by collectively coding a plurality of pieces of quantization step width control information or a plurality of pieces of information indicating whether or not a quantization step width control degeneration signal has a predetermined value, and using the correlation between the information sources.

What is claimed is:

1. An image coding apparatus, comprising:

an image splitting unit that splits an input image;

an orthogonal transformation unit that orthogonally transforms images split by said image splitting unit;

a quantization step width control information output unit that outputs one or more types of quantization step width control information of said split images;

a DC differential signal calculating unit that calculates a difference between a DC signal of signals orthogonally transformed by said orthogonal transformation unit and a DC signal of a split image split immediately before; and a DC differential signal and quantization step width control information coding unit that codes said DC differential signal and said one or more types of quantization step width control information, wherein said DC differential signal and quantization step width control information coding unit changes the code of said DC differential signal and at least one predetermined code of the respective codes of said one or more types of quantization step width control information in accordance with the value of said DC differential signal and at least one of the values of said one or more types of quantization step width control information which is not corresponding to said predetermined code(s).

2. An image coding apparatus, comprising:

an image splitting unit that splits an input image;

an orthogonal transformation unit that orthogonally transforms images split by said image splitting unit;

a quantization step width control information output unit that outputs one or more types of quantization step width control information of said split images;

a DC differential signal calculating unit that calculates a difference between a DC signal of signals orthogonally transformed by said orthogonal transformation unit and a DC signal of a split image split immediately before; and a DC differential signal and quantization step width control information coding unit that codes said DC differential signal and said one or more types of quantization step width control information, wherein said DC differential signal and quantization step width control information coding unit changes the code of said DC differential signal in accordance with at least one of the values of said one or more types of quantization step width control information.

3. An image coding apparatus, comprising:

an image splitting unit that splits an input image;

an orthogonal transformation unit that orthogonally transforms images split by said image splitting unit;

a quantization step width control information output unit that outputs one or more types of quantization step width control information of said split images;

a DC differential signal calculating unit that calculates a difference between a DC signal of signals orthogonally transformed by said orthogonal transformation unit and a DC signal of a split image split immediately before; and a DC differential signal and quantization step width control information coding unit that codes said DC differential signal and said one or more types of quantization step width control information, wherein said DC differential signal and quantization step width control information coding unit changes at least one of the codes of said one or more types of quantization step width control information in accordance with the value of said DC differential signal.

4. An image coding apparatus, comprising:

an image splitting unit that splits an input image;

an orthogonal transformation unit that orthogonally transforms images split by said image splitting unit;

a quantization step width control information output unit that outputs one or more types of quantization step width control information of said split images;

a DC differential signal calculating unit that calculates a difference between a DC signal of signals orthogonally transformed by said orthogonal transformation unit and a DC signal of a split image split immediately before; and a DC differential signal and quantization step width control information coding unit that codes said DC differential signal and said one or more types of quantization step width control information, wherein said DC differential signal and quantization step width control information coding unit changes, in accordance with at least one predetermined value of said one or more types of quantization step width control information, at least one of codes of said one or more types of quantization step width control information which are not corresponding to said predetermined values.

5. The image coding apparatus according to claim 1, further comprising a basic quantization table storing unit, wherein the image coding apparatus uses quantization step width control information as one variable numeric value and multiplies some or all quantization step values of a basic quantization table stored in said basic quantization table storing unit by the quantization step width control information, thereby calculating quantization step values used for quantization.

6. The image coding apparatus according to claim 1, further comprising a basic quantization table storing unit that stores a plurality of basic quantization tables, wherein quantization step width control information is information for selecting a quantization table used for quantization from a plurality of basic quantization tables stored in said basic quantization table storing unit.

7. The image coding apparatus according to claim 1, wherein said DC differential signal and quantization step width control information coding unit comprises: a unit that groups DC differential signals; a unit that degenerates N types of quantization step width control signals; and a multidimensional Huffman coding unit that converts a group number of DC differential signals and N types of quantization step width control degeneration signals degenerated by said quantization step width control signal degenerating unit into (N+1)-dimensional Huffman codes.

8. The image coding apparatus according to claim 1, wherein said DC differential signal and quantization step width control information coding unit comprises: a DC differential signal threshold comparing unit; a DC differential signal coding unit; a quantization step width control signal degenerating unit; and a quantization step width control degeneration signal coding unit, wherein said quantization step width control degeneration signal coding unit performs variable-length coding while switching coding tables for coding quantization step width control degeneration signals, depending on a magnitude relation between the absolute value of a DC differential signal and a predetermined threshold value.

9. The image coding apparatus according to claim 1, wherein said DC differential signal and quantization step width control information coding unit comprises: a DC differential signal coding unit; a unit that detects the states of N types of quantization step width control signals; a quantization step width control signal degenerating unit; and a quantization step width control degeneration signal coding unit, wherein said unit that detects the states of N types of quantization step width control signals judges whether or not a quantization step width control signal is in a predetermined state, said DC differential signal coding unit performs variable-length coding while switching $2^N$ types of coding tables, depending on in which of the two states N types of quantization step width control signals are, and said quantization step width control degeneration signal coding unit, without coding a quantization step width control signal when it is in a predetermined state, codes a quantization step width control degeneration signal when the quantization step width control signal is not in a predetermined state.

10. The image coding apparatus according to claim 7, wherein said quantization step width control signal degenerating unit includes a quantization step width control differential signal calculating unit.

11. The image coding apparatus according to claim 7, wherein said quantization step width control signal degenerating unit includes a unit that groups quantization step width control signals or quantization step width control differential signals.

12. The image coding apparatus according to claim 7, wherein said quantization step width control signal degenerating unit outputs a quantization step width control signal without modification.

13. The image coding apparatus according to claim 7, wherein said unit that groups DC differential signals or s aid unit that groups quantization step width control differential signals puts a signal in a different group for a case where a difference value of the signal is positive and a case where it is negative.

14. The image coding apparatus according to claim 7, wherein said unit that groups DC differential signals or said unit that groups quantization step width control differential signals puts small portions of the absolute value of a signal in an identical group regardless of whether the signal value is positive or negative, and puts large portions of the absolute value of the signal in a different group for a case where the difference value of the signal is positive and a case where it is negative.

15. An image coding apparatus, comprising: an image splitting unit that splits an input image; an orthogonal transformation unit that orthogonally transforms images split by said image splitting unit; a quantization step width control information output unit that outputs a plurality of types of quantization step width control information of said split images; a coding unit that codes signals orthogonally transformed by said orthogonal transformation unit; and a quantization step width control information coding unit, wherein said quantization step width control information coding unit includes a quantization step width control information change pattern creation unit that judges whether N types of quantization step width control signals have changed; a quantization step width control information change pattern coding unit that converts a quantization step width control information change pattern created by said quantization step width control information change pattern creation unit into variable-length codes; and a unit that codes N types of quantization step width control signals that, only when individual quantization step width control signals have changed, codes the quantization step width control signal.

* * * * *